United States Patent Office 3,663,580
Patented May 16, 1972

3,663,580
HALOGEN-AMINOCARBONYLOXY COMPOUNDS
OF THE STEROID SERIES
Kurt Ponsold and Peter Grosse, Jena, Germany, assignors to VEB Jena Pharm, Jena, Germany
No Drawing. Filed Mar. 6, 1970, Ser. No. 17,325
Int. Cl. C07c *169/20, 169/60*
U.S. Cl. 260—397.2
24 Claims

ABSTRACT OF THE DISCLOSURE

Vicinal halogen-aminocarbonyloxy compounds of the steroid series, in which the amino group can be substituted or unsubstituted, having the formula

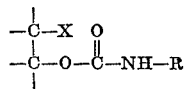

wherein C—C designates a segment of the steroid framework, X designates halogen, and R designates hydrogen, an alkyl, aryl, arylalkyl, cyclohexyl, unsubstituted or substituted amino group or acid group and a process of preparing this class of compounds comprising reacting a cis- or trans-halogen-hydrine of the steroid series with phosgene in an inert solvent under addition of a basic catalyst to form the corresponding chlorocarbonic acid ester, reacting the latter with an NH-active compound in a solvent under addition of an acid binding agent, the reaction being facilitated where necessary by addition of a tertiary amine.

The steroids of the invention are characterized by their outstanding pharmacological activity.

---

This invention relates to a novel class of vicinal halogen-aminocarbonyloxy compounds of the steroid series and to a process of preparing such compounds. More particularly this invention relates to vicinal halogen-aminocarbonyloxy compounds of the steroid series in which the amino group can be substituted or unsubstituted having the formula

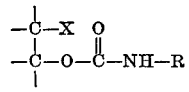

wherein C—C designates a segment of the steroid framework, X designates halogen, and R designates hydrogen, an alkyl, aryl, arylalkyl, cyclohexyl, unsubstituted or substituted amino group or acid group and to a process of preparing such compounds.

It is already known to prepare N-substituted aminocarbonyloxy compounds by reacting a hydroxyl group containing compound with phosgene to form a chlorocarbonic acid ester and thereafter reacting the ester with an NH-active compound. It is also known in the art to react simple steroid alcohols with phosgene to form the corresponding chlorocarbonic acid esters. The reaction of vicinal steroid-halogen-hydrine with phosgene following which the chlorocarbonic acid ester thereby obtained is reacted with an amine to form the vicinal N-substituted halogen-aminocarbonyloxy compound has not, however, as yet been described.

The reaction of steroid alcohols with isocyanates to form aminocarbonyloxy compounds is also known. The preparation of vicinal halogen-aminocarbonyloxy steroids from steroidal halogen hydrines through reaction with isocyanates has, on the other hand, not as yet been described.

The invention lies in the surprising finding that vicinal N-substituted or N-unsubstituted halogen-aminocarbonyloxy steroids can easily be prepared from readily available halogen hydrines of the steroid series. According to the invention, vicinal halogen-aminocarbonyloxy compounds of the steroid series are prepared by reacting a cis- or trans-steroid halogen hydrine with phosgene in an inert solvent, as, for instance, benzene, under addition of a basic catalyst, thereafter reacting the thus formed chlorocarbonic acid ester with an NH-active compound in a suitable solvent under addition of an acid binding agent, and possibly in the presence of a tertiary amine. Instances of suitable solvents are ethanol, tetrahydrofuran and acetone. As NH-active compound there may be suitably used amines, hydrazines, substituted hydrazines, amides, amino acids or their carboxyl derivatives. By the addition of a sufficiently strong basic compound in a suitable amount, the NH-active compound can also be used in the form of its generally more readily handled salt. For the process of the invention, it is immaterial whether the chlorocarboxylic acid ester separated from the excess phosgene is purified or is further used as the crude product.

It has also been found in accordance with the invention, that cis- or trans-steroid halogen hydrines can be reacted with alkyl or aryl substituted isocyanates or with cyanic acid in an inert solvent under elevated temperatures and under addition of a basic catalyst to form the corresponding vicinal halogen-aminocarbonyloxy compound. It has further been found in accordance with the invention that by using alkali cyanates, the free necessary cyanic acid can be obtained during the reaction conducted in an inert solvent by the addition of trifluoracetic acid.

In accordance with the invention, per mol of steroid chlorocarbonic acid ester, 1 to 10 mol, preferably 2.5 mol NH active compound are used while per mol steroid halogen-hydrine, 2–25 mols, preferably 5 to 6 mols isocyanate are reacted.

The halogen-aminocarbonyloxy compounds of the steroid series prepared in accordance with the invention are characterized by their pharmacological activity, the same being derived from the steroid portion of the molecule. The compounds of the invention have been found to possess excellent estrogenic and antigonatropic activity. They may be administered orally or parenterally. Preferably, they are utilized in tablet or capsule form. In addition, the compounds of the invention have been found to constitute highly desirable starting materials for future syntheses.

The invention will be further illustrated by the following examples; however the same are not to be construed in anywise limiting the same.

EXAMPLE 1

16α-bromo-3-methoxy-estra-1,3,5(10)-triene-17β-ol-chlorocarbonic acid ester 500 mg. 16α-bromo-3-methoxy-estra-1,3,5(10)-triene-17β-ol were dissolved in 11 ml. benzene phosgene solution (about 250 mg. phosgene per ml). Following cooling of the resultant solution to about 0° C., 0.2 ml. triethylamine in 1.3 to 1.5 ml. benzene were slowly added thereto. The reaction mixture was allowed to stand overnight at room temperature. It was thereafter filtered and concentrated under vacuum. The resultant oily, slowly crystallizing product was used without further purification for further reaction.

M.P. 116–119° C. Analytical M.P. 130–132° C.

EXAMPLE 2

16α-bromo-17β-cyclohexylaminocarbonyloxy-estra-1,3,5(10)-triene-3-methyl ether

Using the procedure of Example 1, from 500 mg. 16α-bromo-3-methoxy-estra-1,3,5(10)-triene-17β-ol, the chlorocarbonic acid ester was prepared. The ester was dissolved in 20–25 ml. acetone and under ice cooling reacted with 1 ml. cyclohexylamine. The reaction mixture was allowed to stand in an ice bath for 1 hour and then poured into water. The precipitated product was separated off with suction. The recovered product could be crystallized out of methanol.

M.P. 155–158° C. $[\alpha]_D^{23} = +21°$ (c.=1, CHCl$_3$).

EXAMPLE 3

17β-ethylenaminocarbonyloxy-16α-bromo-estra-1,3,5(10)-triene-3-methylether

The chloro-carbonic ester which was prepared, according to the procedure of Example 1, from 500 mg. 16α-bromo-3-methoxy-estra-1,3,5(10-triene - 17β - ol was dissolved in 20 to 25 ml. acetone and under ice cooling reacted with 2 ml. ethylamine. After standing for 1 hour in an icebath, the reaction mixture was poured into water and extracted with benzene. Following drying and concentration, there was recovered an oil which could be crystallized out of methanol.

EXAMPLE 4

17β-benzylaminocarbonyloxy-16α-bromo-estra-1,3,5(10)-triene-3-methylether

The chloro-carbonic acid ester prepared from 500 mg. 16α-bromo-3-methoxy-estra-1,3,5(10)-triene-17β-ol by the procedure set out in Example 1 was dissolved in 20–25 ml. acetone and reacted with 1 ml. benzylamine, under ice cooling. The reaction mixture was allowed to stand for 1 hour in an icebath and was then poured into water and extracted with benzene. After drying and concentration, there was recovered a yellow oil which could be crystallized out of methanol.

M.P.: 160.5–163° C.

EXAMPLE 5

17β-anilinocarbonyloxy-16α-bromo-estra-1,3,5(10)-triene-3-methylether

Following the procedure of Example 1, the chloro-carbonic acid ester was prepare dfrom 500 mg. 16α-bromo-3-methoxy-estra-1,3,5(10)-triene-17β-ol. The ester was dissolved in 20 to 25 ml. acetone and reacted with 1 ml. aniline under ice cooling. After standing for 1 hour in an icebath the reaction mixture was poured into water and extracted with benzene. Following drying and concentration, there was recovered an oil which was crystallized out of benzene-benzine (B.P., 50–60° C.).

M.P. 180–182° C. $[\alpha]_D^{24} = -17°$ (c.=1, CHCl$_3$).

EXAMPLE 6

17β-anilinocarbonyloxy-16β-chloro-estra-1,3,5(10)-triene-3-methylether

Using the procedure set out in Example 1, the chloro-carbonic acid ester was prepared from 500 mg. 16β-chloro-3-methoxy-estra-1,3,5(10)-triene-17β-ol. The ester was dissolved in 20–25 ml. acetone and under ice cooling reacted with 1 ml. aniline. After standing in ice water for 1 hour, the reaction mixture was poured into water and extracted with benzene. Following drying and concentration in vacuum, a colorless, chromatographically pure, amorphous product was recovered.

EXAMPLE 7

16α-bromo-17β-hydrazinocarbonyloxy-estra-1,3,5(10)-triene-3-methylether

The chloro-carbonic acid ester, prepared by the procedure set out in Example 1, from 500 mg. 16α-bromo-3-methoxy-estra-1,3,5(10)-triene-17β-ol, was dissolved in 15 ml. absolute ethanol and 5 ml. tetrahydro-furan and under ice cooling reacted with 0.6 ml. 98% hydrazine hydrate. After standing for 1 hour in an icebath, the reaction mixture was poured into aqueous sodium chloride solution and the precipitated product thereby formed separated off with suction. The purification of the product was carried out by chromatography on silica gel whereby the main impurities were separated off from the desired methylether. The elution was carried out first with benzene-ether (10:1), followed by benzene-methanol (10:1). The product was thereafter crystallized from methanol-water.

M.P.: 146–149° C.

EXAMPLE 8

16α-bromo-17β-isopropylidene hydrazino-carbonyloxy-estra-1,3,5(10)-triene-3-methylether According to the procedure of Example 1, the chloro-carbonic acid ester was prepared from 500 mg. 16α-bromo-3-methoxy-estra-1,3,5(10)-triene - 17β - ol. The ester was dissolved in 20 ml. acetone and under ice cooling reacted with 0.6 ml. 98% hydrazine hydrate. Following standing for 1 hour in an icebath, the reaction mixture was poured into water or aqueous sodium chloride solution and the product which was thereby separated out, taken off by suction filtering. The purification was carried out by chromatographing on silica gel. Benzene-acetone (85:1) served to elute the main impurities, benzene-acetone (40:1), a weaker impurity and thereafter the desired methyl ether. Crystallization was carried out from acetone-water.

M.P.: 153–156° C.

EXAMPLE 9

16α-bromo-17β-N,N-dimethylhydrazino-carbonyloxy-estra-1,3,5(10)-triene-3-methylether The procedure of Example 1 was followed to prepare the chloro-carbonic acid ester from 500 mg. 16α-bromo-3-methoxy-estra-1,3,5(10)-triene-17β-ol. The ester was then dissolved in 15 ml. absolute ethanol and 5 ml. absolute tetrahydrofuran and under ice cooling reacted with 1 ml. N,N-dimethylhydrazine, and thereafter 0.1 ml. triethylamine was introduced into the reaction mixture. Following pouring into water and standing for 1 hour, the precipitated product was separated off with suction. Purification was carried out through chromatographing on silica gel with benzene-ether (10:1). The main impurities were eluted off in the first fractions and the impurity free desired methylether then recovered. Crystallization from methanol-water followed.

M.P.: 179–182° C.

EXAMPLE 10

17β-ethoxycarbonylmethylaminocarbonyloxy-16α-bromo-estra-1,3,5(10)-triene-3-methylether The chloro-carbonic acid ester prepared from 500 mg. 16α-bromo-3-methoxy-estra - 1,3,5(10) - triene-17β-ol by the procedure of Example 1, was dissolved in 2 ml. acetone. 700 mg. glycocollethylester-hydrochloride were introduced into this solution and then under stirring and cooling, 0.8 ml. triethylamine in 5 ml. acetone were added in dropwise fashion. After 2 hours, the reaction mixture was poured into water and the resultant emulsion extracted with ether. Following drying and concentration, there was recovered a slowly crystallizing oil, which could be recrystallized out of methanol.

M.P.: 155–158° C.

EXAMPLE 11

17β-acetamidocarbonyloxy-16α-bromo-estra-1,3,5(10)-triene-3-methylether

The chlorocarbonic acid ester prepared by the procedure of Example 1, from 500 mg. 16α-bromo-3-methoxy-estra-1,3,5(10)-triene-17β-ol was dissolved in 20 ml. acetone and reacted with 300 mg. acetamide. Following the addition of 0.5 ml. triethylamine, the reaction mixture was stirred for 3 hours at room temperature and then poured into water. Following extraction with ether and drying, the ether solution was concentrated. The thusly recovered semi-solid product was purified by chromatographing on silica gel (elution agent—benzene).

M.P.: 117–120° C. (petroleum ether).

EXAMPLE 12

2β-chloro-3α-phenylcarbamyloxy-androstane-17-one 1 g. 2β-chloro-androstane-17-one-3α-ol in 12 ml. absolute toluene was heated under reflux with 1.5 ml. phenylisocyanate and 5 drops triethylamine, for 8 to 10 hours. The solution was concentrated in vacuum until the odor of phenylisocyanate was no longer apparent. The semisolid product was chromatographed over 20 g. aluminum oxide S III with benzene as the eluting agent. The yield amounted to 1.25 g. (90%).

M.P.: 185.5 to 187.5° C. (methanol); $[\alpha]_D^{28} = +93.7°$ (c.=1, CHCl$_3$).

EXAMPLE 13

2α-bromo-3β-ethylcarbamyloxy-cholestane 1 g. 2α-bromo-chloestane-3β-ol in 8 ml. absolute benzene, 8 ml. ethylisocyanate and 4 drops triethylamine were heated to boiling for 14 hours. Following evaporation in vacuum, the product was crystallized from alcohol. The yield amounted to 1.01 g. (87%).

M.P. 124–125.5° C. (ethanol); $[\alpha]_D^{25} = -30.6°$ (c.=1, CHCl$_3$).

EXAMPLE 14

2α-bromo-3β-carbamyloxy-cholestane 2.4 g. 2α-bromocholestane-3β-ol and 2.6 g. sodium cyanate were stirred together in 20 ml. benzene. Thereafter, over a period of 1 minute, 3.1 ml. trifluoroacetic acid were dropped in and the resulting mixture stirred for a further 3 hours. Following standing overnight, the mixture was mixed with water, the benzene layer separated off, the aqueous phase again extracted with benzene and the impurity containing benzene extract washed with water. Following drying over Na$_2$SO$_4$, the extract was concentrated in vacuum and crystallized out of absolute alcohol. The yield amounted to 1.6 g. (61% of theory).

M.P. 203–204.5° C. (absolute ethanol).

$$[\alpha]_D^{21.5} = +21°$$

(c.=1.1, CHCl$_3$).

EXAMPLE 15

3-methoxy-16α-bromo-17α-phenylcarbamyloxy-estra-1,3,5(10)-triene 1.8 g. 3-methoxy - 16α - bromo-estra-1,3,5(10)-triene-17α-ol, 3.6 ml. phenyl-isocyanate and 10–12 drops triethylamine in 20 ml. absolute toluene were maintained at boiling for 15 hours. Following cooling, filtering, concentration in vacuum and chromatographing with benzene over 30 g. Al$_2$O$_3$ SIII (about 800 ml. eluate). The yield amounted to 2.1 g. (93% of theory).

M.P.: 166.5–168.5° C. (methanol/water).

EXAMPLE 16

2α-bromo-3β-phenylcarbamyloxy-cholestane 1 g. 2α-bromo-cholestane-3-β-ol and 0.8 ml. phenylisocyanate in 10 ml. toluene were heated under reflux for 6 hours. Following concentration in vacuum, until the odor of phenylisocyanate was no longer apparent, the product was crystallized out of alcohol or methyl-glycol. The yield amounted to 975 mg. (77%).

M.P.: 167.5–168.5° C. (methylglycol). $[\alpha]_D^{28} = -32°$ (c.=1, CHCl$_3$).

EXAMPLE 17

17β-aminocarbonyloxy-16α-bromo-estra-1,3,5(10)-triene-methylether 1.9 g. 16α-bromo - 3 - methoxy-estra-1,3,5(10)-triene-17β-ol were reacted with sodium cyanate and trifluoroacetic acid according to the procedure of Example 14. The recovered crude product was purified by chromatography on silica gel.

M.P.: 225–228° C. (abs. ethanol) $[\alpha]_D^{22}: +30°$ (c.=0.45; CHCl$_3$).

EXAMPLE 18

16α-bromo-17β-(α-naphthyylamino)-carbonyloxy-1,3,5(10)-1-triene-3-methylether 1 g. of 16α-bromo-33methoxy-e-stra-1,3,5(10).triene-17β-ol was converted into the chlorocarbonic acid ester analogously to the procedure of Example 1 and then reacted with 1 g. α-naphthylamine and 800 mg. K$_2$CO$_3$ in 40 ml. acetone while stirring for four hours at room temperature. Following the addition of water to the reaction mixture, the reaction mixture was extracted with ether, the extract washed with dilute sulfuric acid, dried and evaporated. The crude product thereby recovered was purified by preparative layer chromatography on aluminum oxide (acid, activated substance I) with benzene-acetone as eluting agent.

M.P.: 169–172° C. (ethanol). $[\alpha]_D^{22}: +9°$ (c.=0.5; CHCl$_3$).

EXAMPLE 19

16α-bomo-17β-(N'-phenylhydrazine) carbonyloxy-estra-1,3,5(10)-triene-3-methylether Following the procedure of Example 1, 1 g. of 16α-bromo-3-methoxy-estra-1,3,5(10)-triene-17β-ol was converted into the chlorocarbonic acid ester. The ester was dissolved in 20 ml. abs. THF/20 ml. abs. ethanol and under ice cooling aod stirring reacted with 1 ml. phenylhydrazine. Following stirring for a further hour, water was added to the reaction mixture and it was then extracted with ether. The crude product was precipitated out of benzene/benzine and recrystallized from methanol/water.

M.P.: 168–173° C. (methanol/water). $[\alpha]_D^{21}: +18°$ (c.=0.5; CHCl$_3$).

EXAMPLE 20

16α-bromo-17β-(N'-tosylhydrazino) carbonyloxy-estra-1,3,5(10)-triene-3-methylether 1 g. 16α-bromo-3-methoxy-estra-1,3,5(10)-triene-17β-ol was converted into the chlorocarbonic acid ester according to Example 1, and the ester together with 1.2 g. p-tosylhydrazide stirred for 2 hours in 20 ml. THF/ethanol. After dilution with water and ether extraction, a crude product was recovered which was purified by chromatographing on silica gel with benzene/ether (40:1 increasing to 20:1).

M.P.: 170–173° C. (methanol/water). $[\alpha]_D^{22}: +12°$ (c.=0.4 CHCl$_3$).

EXAMPLE 21

16α-bromo-17β-tosylaminocarbonyl-oxy-estra-1,3,5(10)-triene-3-methyl-ether 6 g. silver cyanate and 1.2 g. p-toluene sulfochloride were thoroughly mixed and the mixture heated to 170° C. After 10 minutes of heating, the mixture was extracted with abs. toluene and the resulting solution heated to boiling for one hour with 400 mg. 16α-bromo-3-methoxy-estra-1,3,5(10)-triene-17β-ol. Following evaporation under vacuum, the residue was crystallized from methanol/water.

M.P.: 186–191° C. (methanol/water. $[\alpha]_D^{21}: +6°$ (c.=0.5; CHCl$_3$).

As acid binding agent, there may be used in the process of the invention, triethylamine and other tertiary amine bases, for instance pyridine. In the case where very strongly basic NH-active compounds are employed as reaction components (see Examples 2–8), no acid binding agent is required as the excess of these NH-active compounds serve for this purpose. It is further possible to use as acid binding agent, metal carbonates such as $K_2CO_3$.

Included among the suitable NH-active compounds are the following: cyclohexylamine, ethylamine, benzylamine, aniline, hydrazines-hydrate, N,N-dimethylhydrazine, glycocol-ethyl-ester hydrochloride, acetamide, phenylhydrazine, α-naphthylamine and tosylhydrazine.

Illustrative starting steroids include 16α-bromo-3-methoxy-estra-1,3,5(10)-triene-17β-ol, 2β-chloro-androstane-17 one-3α-bromo-cholestane-3β-ol, 3-methoxy-16α-bromoestra-1,3,5(10)-triene-17α-ol.

We claim:

1. A vicinal halogenaminocarbonyloxy compound of the steroid series having a formula, selected from (a)
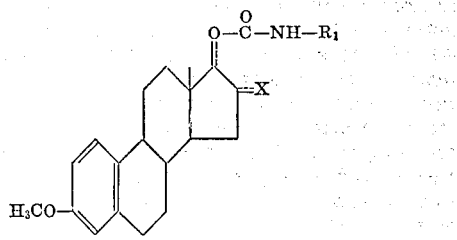

and (b)
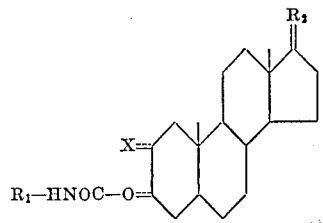

wherein X designates halogen, $R_1$ designates hydrogen, alkyl, aryl, aralkyl and cyclohexyl, unsubstituted mono- or di-substituted amino or an acid group and $R_2$ designates oxygen

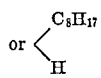

2. A compound according to claim 1 designated 16α-bromo-3-methoxy-estra-1,3,5(10) - triene - 17β-ol-chlorocarbonic acid ester.

3. A compound according to claim 1 designated 16α-bromo - 17β - cyclohexylamino-carbonyloxy-estra-1,3,5 (10)-triene-3-methyl ether.

4. A compound according to claim 1 designated 17β-ethylaminocarbonyloxy - 16α - bromo-estra-1,3,5(101)-triene-3-methyl ether.

5. A compound according to claim 1 designated 17β-benzylaminocarbonyloxy-16α-bromoestra - 1,3,5(10)-triene-3-methyl ether.

6. A compound according to claim 1 designated 17β-anilino-carbonyloxy - 16α - bromo-estra-1,3,5(10)-triene-3-methyl ether.

7. A compound according to claim 1 designated 17β-anilinocarbonyloxy - 16β - chloro-estra-1,3,5(10)-triene-3-methyl ether.

8. A compound according to claim 1 designated 16α-bromo - 17β - hydrazinocarbonyloxy-estra-1,3,5(10)-triene-3-methyl ether.

9. A compound according to claim 1 designated 16α-bromo - 17β - isopropylidenehydrazino-carbonyloxy-estra-1,3,5(10)-triene-3-methyl-ether.

10. A compound according to claim 1 designated 16α-bromo - 17β - N,N-dimethylhydrazinocarbonyl-oxy-estra-1,3,5(10)-triene-3-methyl ether.

11. A compound according to claim 1 designated 17β-ethoxycarbonylmethylaminocarbonyloxy - 16α - bromo-estra-1,3,5(10)-triene-3-methyl ether.

12. A compound according to claim 1 designated 17β-acetamido-carbonyloxy - 16α - bromo-estra-1,3,5(10)-triene-3-methyl ether.

13. A compound according to claim 1 designated 2β-chloro-3α-phenylcarbamyloxy-androstane-17-one.

14. A compound according to claim 1 designated 2α-bromo-3β-ethylcarbamyloxy-cholestane.

15. A compound according to claim 1 designated 2α-bromo-3β-carbamyloxy-cholestane.

16. A compound according to claim 1 designated 3-methoxy - 16α - bromo - 17α - phenylcarbamyloxy-estra-1,3,5(10)-triene.

17. A compound according to claim 1 designated 2α-bromo-3β-phenylcarbamyloxy-cholestane.

18. Process of preparing a compound according to claim 1 which comprises reacting a cis- or trans-halogenhydrin of the steroid series having a formula selected from (a)

and (b)
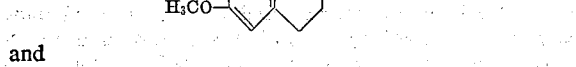

wherein X designates halogen and $R_2$ designates oxygen or

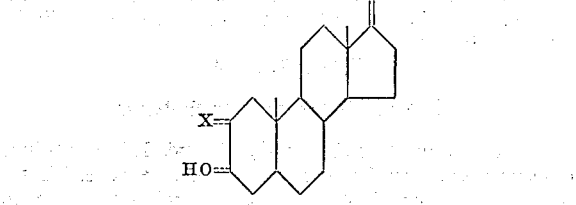

with phosgene in an inert solvent in the presence of a basic catalyst and thereafter reacting the chlorocarbonic acid ester of the steroid thereby formed with 1 to 10 mol NH-active compound selected from the group consisting of alkylamines arylamines, aralkylamines, cyclohexylamine, unsubstituted, mono- or disubstituted hydrazine or an amide in a solvent at temperature not exceeding room temperature and under addition of an acid binding agent.

19. Process according to claim 18 wherein said NH-active compound is used in the form of its salt and is freed in situ by addition of a strongly basic compound.

20. Process of preparing a compound according to claim 1 wherein $R_1$ designates hydrogen, alkyl or aryl which comprises reacting cis- trans-steroid halogenhydrin having a formula selected from

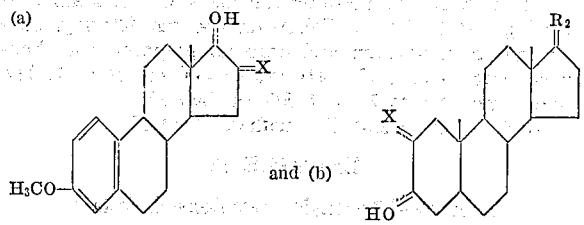

wherein X designates halogen and $R_2$ designates oxygen or

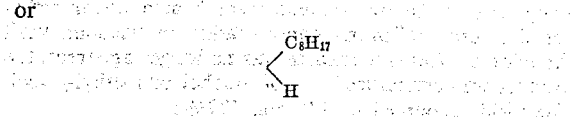

with 2 to 25 mols, of an alkyl- or aryl-isocyanate or with free cyanic acid at an elevated temperature in an inert solvent, in the presence of a tertiary amine as catalyst.

21. Process according to claim 20 wherein the free cyanic acid is formed during the reaction from sodium cyanate and tri fluoroacetic acid.

22. Process according to claim 18, wherein said basic catalyst is triethylamine.

23. Process according to claim 18 wherein said NH-active compound is used in an amount of 2.5 mols.

24. Process according to claim 18 wherein said acid binding agent is a member selected from the group of trialkylamine, tertiary amines and metal carbonates.

References Cited

UNITED STATES PATENTS 3,153,065  10/1964  Bowers et al. _____ 260—397.45
3,169,137  2/1965  Wendt et al. _____ 260—397.5

ELBERT L. ROBERTS, Primary Examiner

U.S. Cl. X.R.

260—397.4; 397.5